(12) United States Patent
Freedman (10) Patent No.: US 8,478,032 B2
(45) Date of Patent: Jul. 2, 2013

(54) SEGMENTING AN IMAGE

(75) Inventor: Daniel Freedman, Zikhron Ya'aqov (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 13/114,690

(22) Filed: May 24, 2011

(65) Prior Publication Data

US 2012/0301017 A1 Nov. 29, 2012

(51) Int. Cl.
*G06K 9/00* (2006.01)
(52) U.S. Cl.
USPC .......................................................... 382/164
(58) Field of Classification Search
USPC ................ 382/162, 164–165, 100, 173, 169, 382/224, 128–133; 348/586, 598
See application file for complete search history.

(56) References Cited

U.S. PATENT DOCUMENTS

| | | | |
|---|---|---|---|
| 7,570,811 B2 * | 8/2009 | Marquering et al. | 382/173 |
| 7,907,769 B2 * | 3/2011 | Sammak et al. | 382/133 |
| 8,073,264 B2 * | 12/2011 | Lin et al. | 382/224 |
| 8,238,660 B2 * | 8/2012 | Lin et al. | 382/173 |
| 8,259,234 B2 * | 9/2012 | Hudson | 348/586 |
| 2008/0187198 A1 | 8/2008 | Grady et al. | |
| 2009/0060333 A1 | 3/2009 | Singaraju et al. | |
| 2010/0002929 A1 | 1/2010 | Sammak et al. | |
| 2010/0104186 A1 | 4/2010 | Grady et al. | |
| 2010/0183225 A1 | 7/2010 | Vantaram et al. | |

OTHER PUBLICATIONS

Daniel Freedman, "An Improved Image Graph for Semi-Automatic Segmentation," SpringerLink, Sep. 5, 2010.
Leo Grady, "Random Walks for Image Segmentation," IEEE Transactions on Pattern Analysis and Machine Intelligence, vol. 28, No. 11, Nov. 2006.
Dorin Comaniciu et al., "Mean Shift Analysis and Applications," Dept. of Electrical and Computer Engineering, Rutgers University, pp. 1-8.
Dorin Comaniciu et al., "Mean Shift: A Robust Approach Toward Feature Space Analysis," Dept. of Electrical and Computer Engineering, Rutgers University, pp. 1-37.
Luc Vincent et al., "Watersheds in Digital Spaces: An Efficient Algorithm Based on Immersion Simulations," IEEE Transactions on Pattern Analysis and Machine Intelligence, vol. 13, No. 6, Jun. 1991.
Pedro F. Felzenszwalb, "Efficient Graph-Based Image Segmentation," International Journal of Computer Vision, pp. 1-26.
Baris Sumengen et al., "Multi-Scale Edge Detection and Image Segmentation," ECE Department, UC, Santa Barbara, 4 pages.
Iasonas Kokkinos, et al., "Modulation-Feature Based Textured Image Segmentation Using Curve Evolution," National Technical University of Athens, 4 pages.

(Continued)

*Primary Examiner* — Ishrat I Sherali (57) ABSTRACT

A technique includes representing an image to be segmented using a graph including vertices and edges, where a subset of the vertices is marked as belonging to a plurality of objects. The technique includes assigning weights to the edges based at least in part on color probability densities associated with the objects derived from the subset of vertices marked as belonging to the plurality of objects; and segmenting the image, including identifying boundaries of the objects based at least in part on the weights and the graph.

20 Claims, 7 Drawing Sheets

OTHER PUBLICATIONS

Yizong Cheng, "Mean Shift, Mode Seeking, and Clustering," IEEE Transactions on Pattern Analysis and Machine Intelligence, vol. 17, No. 8, Aug. 1995.

Keinosuke Fukunaga, The Estimation of the Gradient of a Density Function, With Applications in Pattern Recognition, IEEE Transactions on Information Theory, vol. 21, No. 1, Jun. 1975.

* cited by examiner

SEGMENTING AN IMAGE

BACKGROUND

An image may be segmented into separate regions, for such purposes as computer vision, image processing and computer graphics applications. Semi-automatic segmentation, in general, relies on some form of user input to segment an image into two or more separate regions, with each of these regions corresponding to a particular object (or the background, which itself may be considered an object).

For example, a user may introduce input to semi-automatic segmentation application by "scribbling" on each object of interest in an image for purposes of marking the object and identifying a small number of pixels that are contained within the object. A bounding box is another way in which a user may mark an object of interest and identify a small number of pixels that are contained within the object.

Semi-automatic segmentation may be used, for example, in the arena of image editing tools, such as in graphic arts and elsewhere, in which objects are extracted from images. The more minimal the user input, the faster the graphic artist is able to complete the underlying task. Semi-automatic segmentation may also be used in medical imaging, which allows a physician to, for example, quickly and accurately segment a particular organ or tumor, thereby allowing image-guided radiation therapy planning, among many other possible applications.

DETAILED DESCRIPTION

In accordance with exemplary implementations, systems and techniques are disclosed herein to perform semi-automatic segmentation (i.e., segmentation that is seeded using user-provided input) of an image based at least in part on the color probability distributions of objects in the image. Because the segmentation disclosed herein defines the homogeneity of a given region of an image is defined in terms of a color probability density rather than in terms of the color or grayscale intensities in the region, more accurate segmentation may be achieved, especially when one or more objects of the image are textured or have multiple color components.

Figure 1:
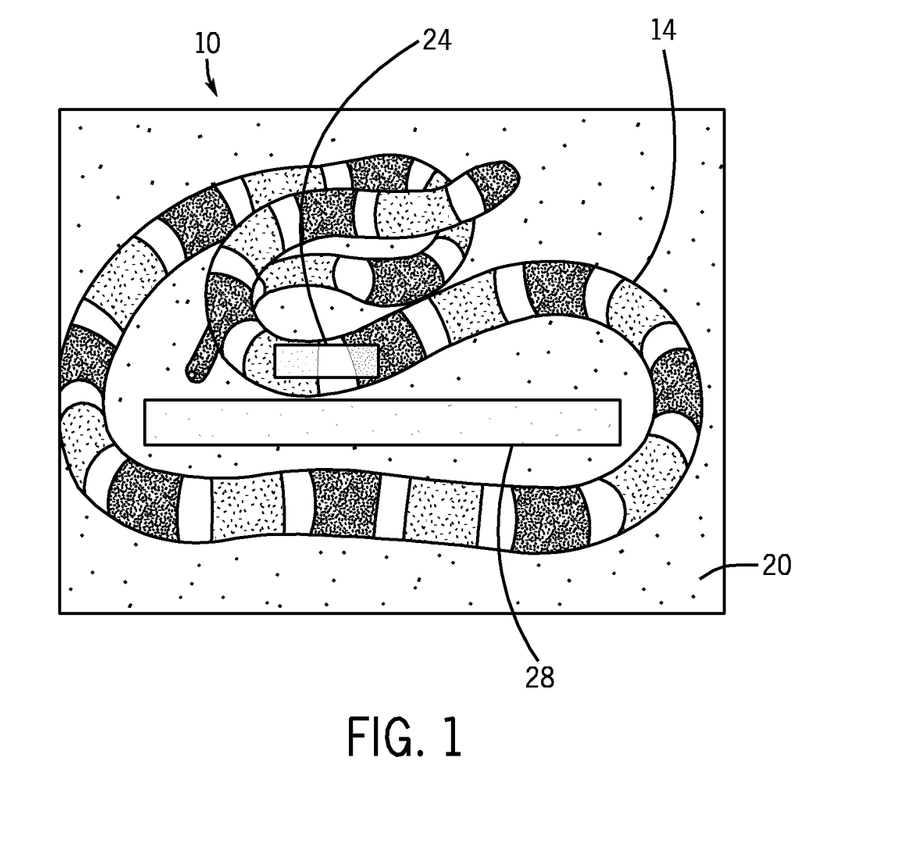
FIG. 1 is an illustration of an image to be segmented and the use of bounding boxes to capture user input to aid the segmentation according to an example implementation.
Figure 2:
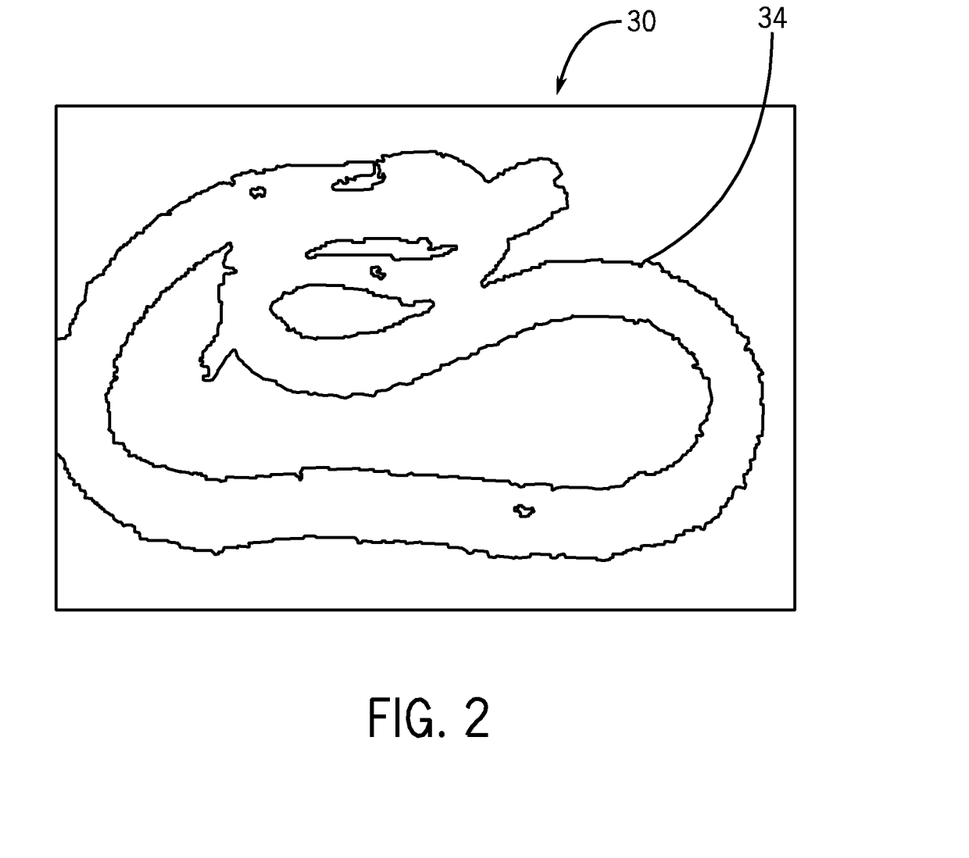
FIG. 2 is a visualization of a segmentation generated from the image of FIG. 1 according to an example implementation.

As a more specific example, FIG. 1 is an image 10 that depicts a coral snake. For purposes of semi-automatically segmenting the image 10, a user may, via a bounding box 24, mark the coral snake as being a first object 14 of the image 10 and mark, via another bounding box 28, a background 20 of the image 10 as being a second object of the image 10. Therefore, ideally, segmentation of the image 10 should distinguish the two objects 14 and 20. FIG. 2 depicts an exemplary segmentation 30 of the image 10, which is based at least in part on color probability densities that were derived from the pixels that were contained in the bounding boxes 24 (for the object 14) and 28 (for the background 20). As shown in FIG. 2, the segmentation produces an image 30 showing a segmented image 34, which corresponds to the first image 14 (i.e., the coral snake) of FIG. 1. In other words, the segmentation for this example accurately identifies the boundaries between the user-identified objects 14 and 20.

This approach to segmenting differs from conventional semi-automatic segmentation that relies on grayscale or color intensities to distinguish the boundaries of the objects being segmented. For the specific example that is set forth in FIG. 1, the coral snake has distinct red, black and yellow segments. As a result, a conventional, semi-automatic segmentation technique may segment the image 10 not according to the objects 14 and 20, but rather, according to the grayscale or color homogeneity, which means, the color bands of the coral snake may be undesirably segmented into multiple corresponding objects.

Figure 3:
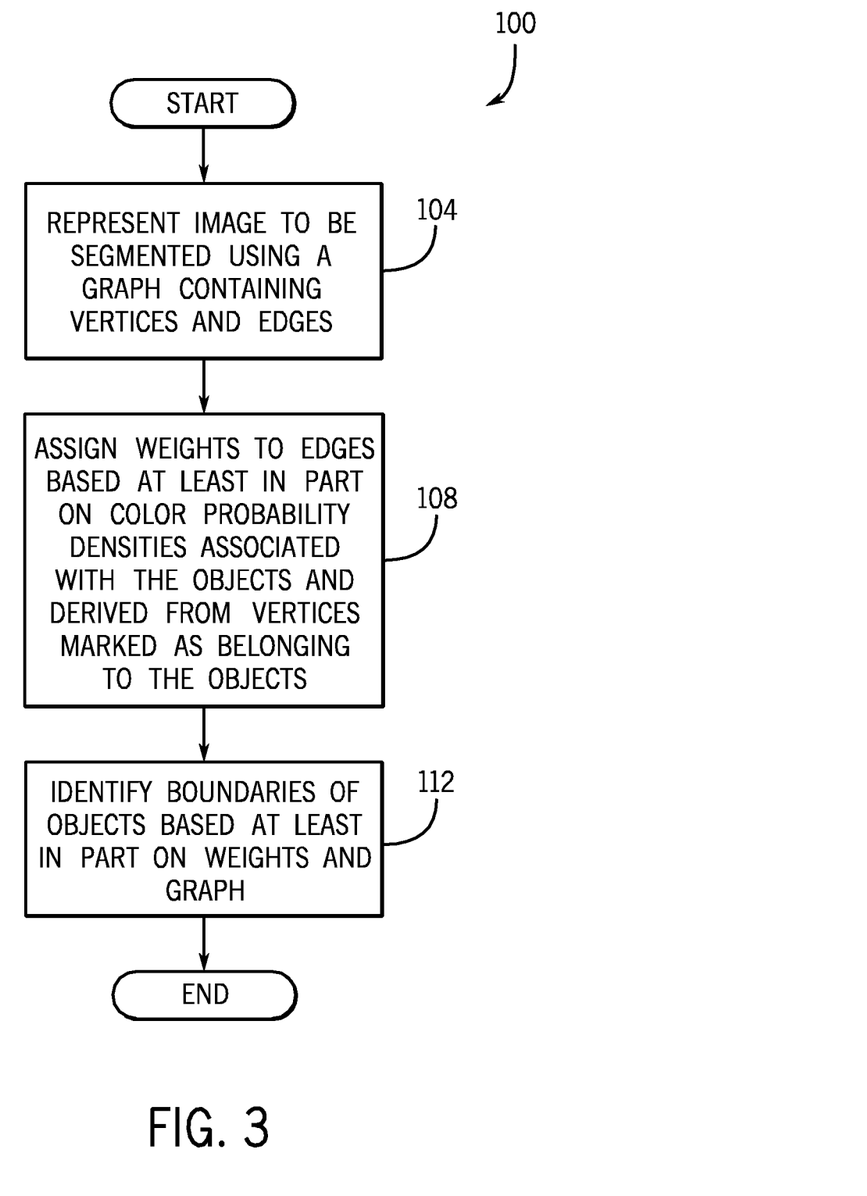
FIGS. 3, 6A and 6B are flow diagrams depicting techniques to segment an image using user-provided input according to example implementations.

Referring to FIG. 3, the semi-automatic segmentation that is disclosed herein may generally follow a technique 100, in accordance an exemplary implementation. The technique 100 includes representing (block 104) an image to be segmented using a graph that contains vertices and edges. In this manner, an edge is formed from a pair of vertices in the image, which are neighbors. In its simplistic form, the vertices may be pixels of the image, although, as further disclosed herein, other vertices may be assigned, in accordance with other implementations.

Next, according to the technique 100, weights are assigned (block 108) to the edges of the graph based at least in part on the color probability densities associated with the objects. As mentioned above, these color probability densities are derived from vertices that are marked as belonging to the objects via user input that employs bounding boxes, scribbles or other user-assigned object identifiers. The boundaries of the objects are then identified, pursuant to block 112, based on at least in part on the edge weights and the graph.

Turning now to a more specific example, the semi-automatic segmentation that is disclosed herein relies on user-supplied seeds. For example, as illustrated in FIG. 1, the seeds correspond to the pixels that are enclosed by the bounding boxes 24 and 28: the pixels enclosed by the bounding box 24 are the seeds for the object 14; and the pixels enclosed by the bounding box 28 are the seeds for the object 20. It is assumed for the examples described herein that the user has not made any mistakes. In other words, it is assumed that the set of seeds identified by a corresponding bounding box accurately corresponds to only pixels of one of the objects. Given the seeds, the goal of the semi-automatic segmentation scheme is to take the limited information that is provided by the user and to propagate this information to the remainder of the image, such that all of the pixels of the image may be labeled as belonging to one of the marked objects.

In accordance with example implementations disclosed herein, a Random Walker-based technique is used to segment the image based on a graph of vertices and edges and weights that are assigned to the edges. The Random Walker technique is generally disclosed in L. Grady, "Random Walks for Image Segmentation," *IEEE Transactions on pattern analysis and machine intelligence,* 28(11): 1768, 2006. The Random Walker technique is first generally described below, and next, the modification of the Random Walker technique to allow semi-automatic segmentation that is based at least in part on color probability densities in accordance with exemplary implementations is described below.

Pursuant to the Random Walker technique, an undirected graph $G=(V,E)$ is formed from an image to be segmented, where the vertex set V represents the set of pixels in the image and the edge set E represents pairs of pixels, which correspond to the edges of the graph G, in accordance with an example implementation. It is noted that the vertex set V may be formed using other criteria other than the pixel locations, as further disclosed herein.

The vertex set V is partitioned into a set of "marked vertices," called "$V_m$," which are the pixels that the user has marked as belonging to the various objects, i.e., the seeds. The vertex set V also includes "unmarked vertices," called "$V_u$," which forms the remaining set of vertices of the vertex set V.

For the undirected graph G and for the example of where the vertices are formed from pixels, edge set E includes pairs of pixels which are neighbors in the image, using either a 4 pixel or 8 pixel neighborhood, as non-limiting examples. The graph G is weighted by edge weights, where the weight of each edge (called "$e=(v_i,v_j)$") depends on the difference between the grayscale intensities or colors of the two pixels associated with the edge. As a non-limiting example, if a distance function (called "$d=(v_i,v_j)$") is defined as being equal to "$\|z=(v_i)-z(v_j)\|$," where "z" represents the grayscale intensity (a scalar) or color (a three-dimensional vector), then the weight of a given edge may be expressed as follows:

$$w(v_i, v_j) = e^{d=(v_i,v_j)^2/\sigma^2}, \text{ or } w(v_i, v_j) = \frac{1}{1+d(v_i, v_j)/\sigma}, \quad \text{Eq. 1}$$

where "$w(v_i,v_j)$" represents the edge weight, "$v_i$" represents one vertex of the edge; $v_j$ represents the other vertex of the edge; and "$\sigma$" represents the parameter to be set. Therefore, in view of Eq. 1, the edge weights lie in the range of [0,1]: for similar pixels, the edge weight close to 1; and for pixels having significantly grayscale intensities, the edge weight is close to zero.

Given the above-described graph structure, the idea behind the Random Walker algorithm is as follows. If there are K possible objects (including the background) within the image, then each one of the marked vertices in the marked vertex set $V_m$ belongs to one of the K objects. Because each edge weight is in the range [0,1], the edge weight may be interpreted as a transition probability from one pixel in the edge to the other. Given the definition of the edge weights of Eq. 1, a pixel is more likely to transition to its neighbor if the neighbor is very similar to it (in color or grayscale intensity) and is unlikely to make the transition if the neighbor is dissimilar.

The Random Walker technique uses the concept of "random walks" on the graph G, given the transition probabilities. In particular, for each unmarked vertex in the unmarked vertex set $V_u$, the probability (called "$p_i^k$" herein) that a random walk beginning at that vertex reaches any one of the marked vertices from a particular object K is determined. The image is then segmented according to the $p_i^k$ probabilities.

More specifically, for any vertex $v_i$ the vertex $v_i$ is classified as belonging to a segment k if $p_i^k > p_i^{k'}$ for all $k' \neq k$. It is noted that edges in the image (as opposed to edges in the graph G) correspond to low transition probabilities as the edges involve a rapid change in color or grayscale intensity. Thus, the above-described Random Walker technique tends to respect image edges in performing the segmentation.

Instead of actually performing the above-described random walks, the probabilities $p_i^k$ may be determined through the solution of a large, sparse linear system. In particular, if the degree of a vertex $v_i$ is represented by $\delta_i = \Sigma_{j \in adj(i)} w(v_i, v_j)$, then the Laplacian matrix may be defined as follows:

$$L_{ij} = \begin{cases} \delta_i & \text{if } i = j \\ -w(v_i, v_j) & \text{if } i \text{ and } j \text{ are adjacent} \\ 0 & \text{otherwise.} \end{cases} \quad \text{Eq. 2}$$

The block decomposition of the Laplacian may be written as follows:

$$L = \begin{bmatrix} L_m & B \\ B^T & L_u \end{bmatrix}. \quad \text{Eq. 3}$$

The Laplacian L may be further represented as follows:

$$L_u p^k = -B^k f_k, \quad \text{Eq. 4}$$

where "$f^k$" represents the $|V_m| \times 1$ vector, such that $f_i^k=1$ if vertex $v_i$ has been marked as belonging to $k^{th}$ object, and 0 otherwise; and where "$p^k$" represents the $|V_u| \times 1$ vector containing the variables $p_i^k$.

As illustrated by FIG. 1, the grayscale or color intensity of a region (a textured region, for example) of an object may not convey the proper notions about homogeneity of the region. However, in accordance with the systems and techniques disclosed herein, the prior information provided in the form of user input provides information regarding the profiles of the various objects, and this extra information is used for purposes of formulating more meaningful edge weights than the edge weights that are used in traditional Random Walker-based semi-automatic segmentation.

More specifically, in accordance with example implementations, a color probability density is used in the formation of the edge weights. In particular, denoting the three component color vector by the identifier "z," "$\rho^k(z)$" is the probability density of the $k^{th}$ object, which is learned from the user input. Given the color density $\rho^k(z)$, a distance $d^k(v_i,v_j)$ of the distance between vertices of a given edge may be defined as follows:

$$d^k(v_i,v_j) = |\rho^k(z(v_i)) - \rho^k(z(v_j))| \quad \text{Eq. 5}$$

with the edge weights correspondingly described as follows:

$$w^k(v_i, v_j) = \frac{1}{1 + d^k(v_i, v_j)/\sigma}. \quad \text{Eq. 6}$$

The weight for a given edge is different for each object. Therefore, k separate Laplacians $L_k$ are determined, as described below:

$$L_{ij}^k = \begin{cases} \delta_i^k & \text{if } i = j \\ -w^k(v_i, v_j) & \text{if } i \text{ and } j \text{ are adjacent} \\ 0 & \text{otherwise,} \end{cases} \quad \text{Eq. 7}$$

where, the degree of the vertex is described as follows:

$$\delta_i^k = \sum_{j \in adj(i)} w^j(v_i, v_j) \quad \text{Eq. 8}$$

The Random Walker-based equation may then be solved for the probabilities $p^k$ as follows:

$$L_u^k p^k = B^k f^k, \quad \text{Eq. 9}$$

where "$L_u^k$" and "$B^k$" are drawn from the block decomposition of $L^k$, as set forth in Eq. 3.

Thus, the above-disclosed technique effectively eliminates the problem in which a given object has distinctly perceptually different color or grayscale intensities, as the homogeneity of a region is defined in terms of a color probability density, rather than in color or grayscale intensities. As a result, an object that is either textured or has multiple components is treated as being more homogenous from the point of view of the learned probability density. Therefore, for the example of FIG. 1, relatively low edge weights are not assigned along the boundaries between the red, yellow and black regions of the coral snake depicted in FIG. 1.

In accordance with some example implementations, conditional probabilities may be used for purposes of assigning edge weights, instead of assigning these weights based directly on color probability densities. In this manner, a conditional probability (called "$\pi_i^k$") may be defined as follows:

$$\pi_i^k = \text{prob}(v_i \in \text{obj}_k | z(v_i) = z), \quad \text{Eq. 10}$$

The $\pi_i^k$ conditional probability is the conditional probability that vertex i is part of the $k^{th}$ object given that the known color is z. The conditional probability $\pi_i^k$ may be determined using Bayes' Rule, as set forth below:

$$\pi_i^k = \text{prob}(v_i \in \text{obj}_k | z(v_i) = z) \quad \text{Eq. 11}$$

$$= \frac{\text{prob}(z(v_i) = z | v_i \in \text{obj}_k) \text{prob}(v_i \in \text{obj}_k)}{\sum_{k'=1}^{K} \text{prob}(z(v_i) = z | v_i \in \text{obj}_{k'}) \text{prob}(v_i \in \text{obj}_{k'})}$$

$$= \frac{\rho^k(z(v_i))}{\sum_{k'=1}^{K} \rho^{k'}(z(v_i))},$$

where in Eq. 11 it is assumed that $\text{prob}(v_i \in \text{obj}_k) = 1/K$ for all k', which is a reasonable assumption in the absence of other information. The distance $d^k(v_i, v_j)$ may then be determined based on the conditional probability, as follows:

$$d^k(v_i, v_j) = |\pi_i^k - \pi_j^k|. \quad \text{Eq. 12}$$

Moreover, the edge weight may be determined using the L distance derived from Eq. 12 via Eq. 6.

There are several advantages to basing the edge weights on the conditional probability $\pi_i^k$, as opposed to basing them directly on the probability density $\rho^k(z(v_i))$. For example, it may be more mathematically sensible to work with probabilities rather than densities. More specifically, probabilities are bounded between zero and one, which is not the case with densities. As a result, it may be easier to set the parameter σ in Eq. 6. Moreover, within a given object, probabilities tend to be smoother than probability densities.

For example, image an example in which a first object is a mixture of green and red in proportions of 70 to 30 percent, respectively; and for this example, a second object is blue. Within the first object, the density is larger for green than for red, leaving to variations in the value of $\rho^k(z)$ as the image transitions from green to red pixels and hence to edge weights which are now close to one. By contrast, there is no variation in the value of $\pi_i^k$ as the image transitions from green to red pixels and therefore, the corresponding edge weights are all ones. Finally, it is possible to use the conditional probabilities $\pi_i^k$ as prior probabilities. That is, if the conditional probabilities $\pi_i^k$ are large, the segmentation may be biased towards choosing vertex i as part of segment k.

The densities $\rho^k(z)$ may be determined based on the user inputs, which in turn, are used to determine the conditional probabilities $\pi_i^k$. In effect, for each object k, the user supplies a set of samples $\{z_i^k\}_{i=1}^{n_k}$, which are the color vectors of the seed pixels for object k. Based on this set of color vectors, the estimate for $\rho^k(z)$ is determined.

As an example implementation, it may be assumed that the color space is the LUV color space, instead of the RGB color space. In accordance with example implementations, the $\rho^k(z)$ probability density is determined as follows. In general, the determination involves determining a histogram of the data formed by the $\{z_i^k\}_{i}^{n_k=1}$ as samples and then interpolating between bins of the histogram to gain smoothness. More specifically, the bins may be denoted by the index "b"; the probability of each bin b given by the histogram may be denoted as "$\xi_b$"; the midpoint of each bin may be referenced by "$m_b$"; and the arbitrary color vector z falls into the bin b(z). Furthermore, because each bin structure is a hyperrectangle, each bin b may be written as $b = (i_1, i_2, i_3)$, i.e., one coordinate for each dimension of the color vector z.

It is assumed that the vector z falls into bin b(z). To determine the density $\rho(z)$, the neighboring bin probabilities $\xi_{b'}$ is interpolated, where the neighbors b' are the neighbors that satisfy $\|b' - b(z)\|_\infty \leq 1$. Because the color vector v is three-dimensional, the bin probabilities are twenty-seven bin neighborhood, including the bin b(z) itself. By defining $b(z) = (i_1^z, i_2^z, i_3^z)$, the interpolation may be described as follows:

$$\rho(z) = \frac{1}{c} \sum_{i_1=-1}^{1} \sum_{i_2=-1}^{1} \sum_{i_3=-1}^{1} \omega_{i_1, i_2, i_3}(r(z)) \xi_{i_1^z + i_1, i_2^z + i_2, i_3^z + i_3}, \quad \text{Eq. 13}$$

where "r(z)" refers to a relative coordinate within bin b(z), as set forth below:

$$r(z) = \frac{z - m_{b(z)}}{s}, \quad \text{Eq. 14}$$

where "s" represents the width of the bin and "$\omega_{i_1, i_2, i_3}(r(z))$" is the weight given to the neighbor whose index is $(i_1^z + i_1, i_2^z + i_2, i_3^z + i_3)$.

In the determination of the densities, the edge weights ω are constrained to sum to one, as set forth below:

$$\sum_{i_1=-1}^{1} \sum_{i_2=-1}^{1} \sum_{i_3=-1}^{1} \omega_{i_1, i_2, i_3}(r) = 1 \forall r, \quad \text{Eq. 15}$$

and "C" in Eq. 13 is a normalizing constant. To satisfy the constraint of summing to one, while also ensuring that the density estimate is sufficiently smooth, i.e., $\rho(\cdot) \in C^2$, the following relationships are defined:

$$\omega_{i_1, i_2, i_3}(r) = \prod_{j=3}^{3} \omega_{ij}(r), \quad \text{Eq. 16}$$

$$\omega_{-1}(r) = \max\left\{\frac{1}{2}[1-(1+2r)^3], 0\right\}, \qquad \text{Eq. 17}$$

$$\omega_{+1}(r) = \max\left\{\frac{1}{2}[1-(1-2r)^3], 0\right\}, \text{ and} \qquad \text{Eq. 18}$$

$$\omega_0(r) = 1 - (\omega_{-1}(r) + \omega_{+1}(r)). \qquad \text{Eq. 19}$$

The constant C is chosen so that ρ integrates to one, so that it is a true probability density. However, because ρ is used to compute the conditional probabilities $\pi_i^k$, determining the constant C is unnecessary, because the constant C drops out of Eq. 11.

For purpose of using the Random Walker algorithm, the linear system set forth in Eq. 9 is solved K times, where "K" represents the number of objects to be segmented. The linear system is O(n) in size, where "n" represents the number of pixels. Standard techniques for solving linear systems have a complexity O(n³). Due to the sparse nature of the system, this can be accelerated considerably, but the final complexity still depends on n. For purposes of speeding up the algorithm, the size of the relevant linear system is reduced through the use of oversegmentation and more specifically, is reduced by applying a mean shift algorithm, as further described below. Using the mean shift algorithm, the vertex set V is no longer confined to the pixel locations.

In the mean shift algorithm, the pixels are taken to be samples of a probability distribution over color space, and an estimate of the probability density is formed by using a Kernel Density Estimate (KDE), which is a non-parametric estimate that essentially places a small "bump" i.e., the kernel, at each point and then sums up these bumps. The kernel may be taken to be a Gaussian distribution, although kernels with compact support also may be used. Given a KDE, the mean shift algorithm is essentially a hill climbing algorithm. In other words, starting at any point z in color space, the mean shift algorithm is a relatively efficient iterative scheme, which brings z up the hill of the KDE, finally stopping at the local maximum, or mode, of the KDE in the basin of attraction z lies. Further details of the mean shift algorithm are disclosed, for example, in K. Fukunaga and L. Hostetler, "The Estimation of the Gradient of a Density Function, with Applications in Pattern Recognition," *IEEE Transactions on Information Theory*, 21(1):32-40, 1975; Y. Cheng, "Mean Shift, Mode Seeking, and Clustering," *IEEE Transactions on Pattern Analysis and Machine Intelligence*, 17(8):790-799, 1995; and D. Comaniciu and P. Meer, "Mean Shift: A Robust Approach Toward Feature Space Analysis," *IEEE Transactions on Pattern Analysis and Machine Intelligence*, pages 603-619, 2002.

Figure 5:
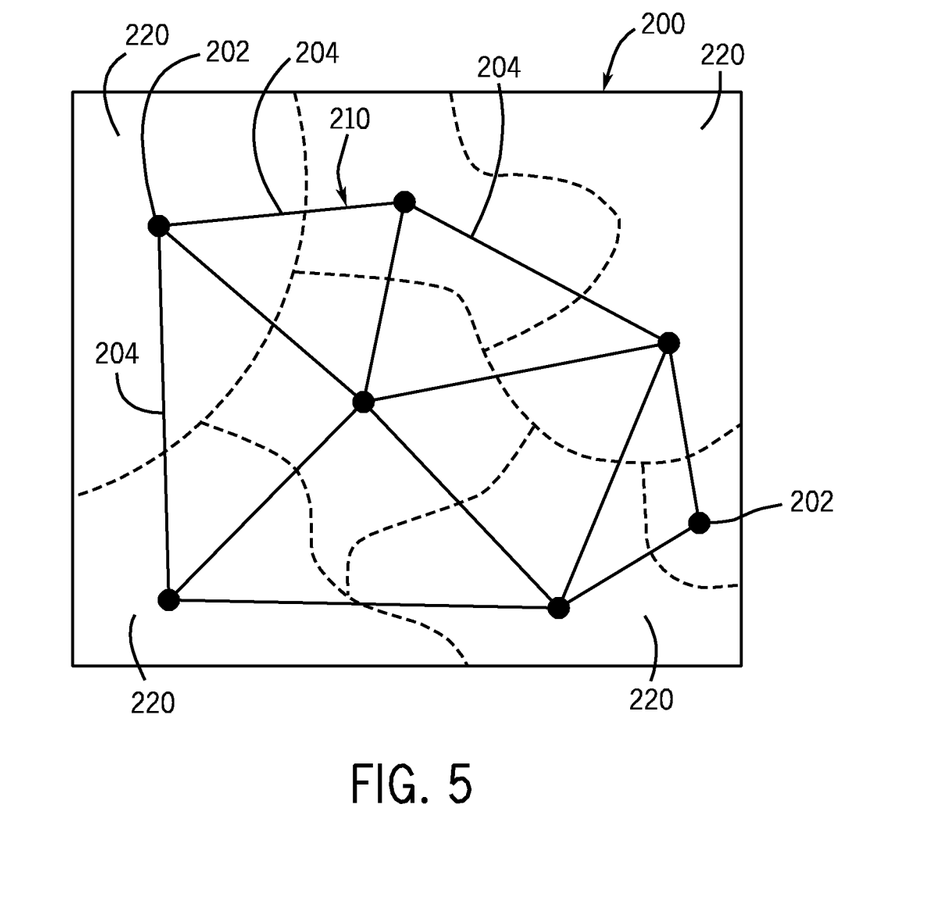
FIG. 5 is an illustration of oversegmentization according to an example implementation.

The mean shift algorithm may be used to construct a smaller graph G in a preprocessing stage, as further disclosed below. In this manner, the new graph (called "G'=(V',E')" has as vertices each of the segments that are determined by the mean shift algorithm. The corresponding edge set E' includes pairs of segments, which are adjacent to the plane. Referring to FIG. 5, in an illustration 200 of the oversegmentation using the mean shift algorithm, boundaries of mean shift segments 220 define associated vertices 202 and associated edges 204 of a graph 210. As depicted in FIG. 5, the graph 210 is irregular but sparse. The irregularity does not affect application of a Random Walker-based technique, which does not assume a regular structure on the graph. As an example, the vertex set V may be reduced from a set of 106 elements to one of 103 elements, leading to a significantly large savings in computation time.

Other implementations are contemplated and are within the scope of the appended claims. For example, other oversegmentation algorithms, in lieu of the mean shift algorithm, may be used in accordance with other example implementations. In this manner, the water shed-based oversegmentation algorithm that is disclosed in L. Vincent and P. Soille, "Watersheds in Digital Spaces: An Efficient Algorithm Based on Immersion Simulations," *IEEE transactions on Pattern Analysis and Machine Intelligence*, 13(6):583-598, 1991, may be used as well as the graph-based algorithm that is disclosed in P. F. Felzenszwalb and D. P. Huttenlocher, "Efficient Graph-Based Image Segmentation," *International Journal of Computer Vision*, 59(2):167-181, 2004.

Figure 6A:
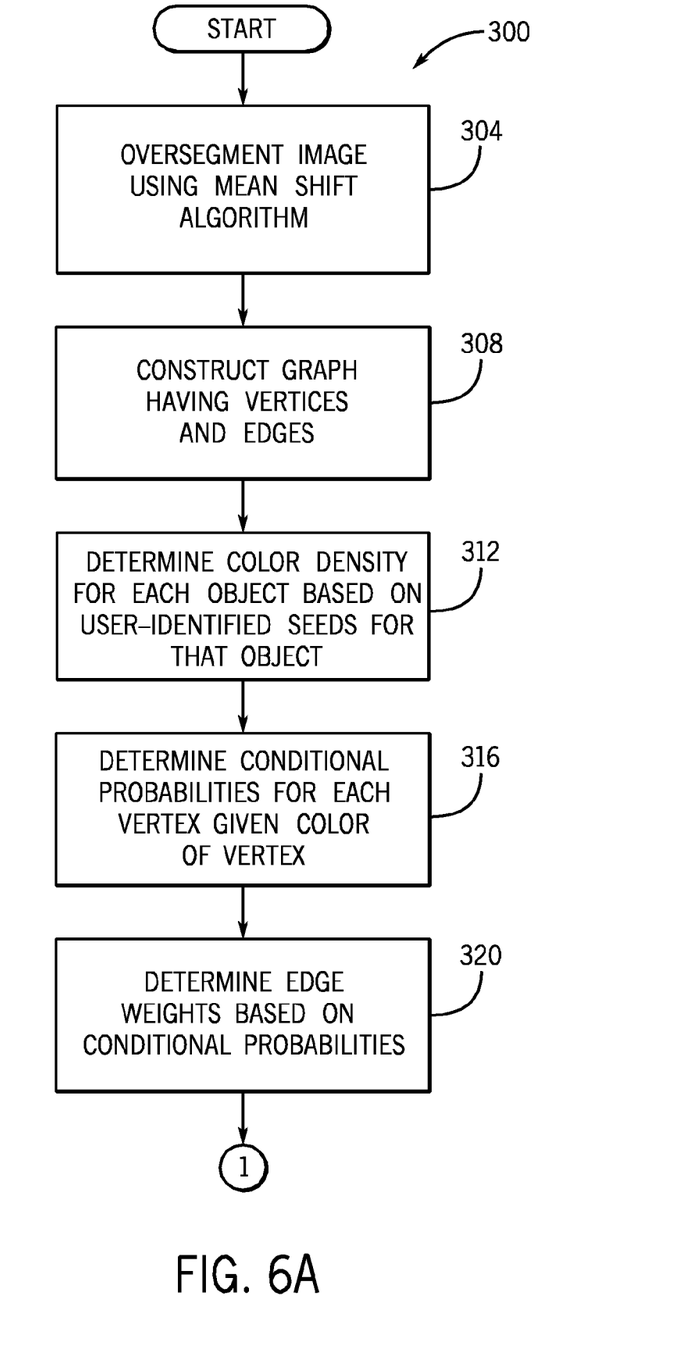
Figure 6B:
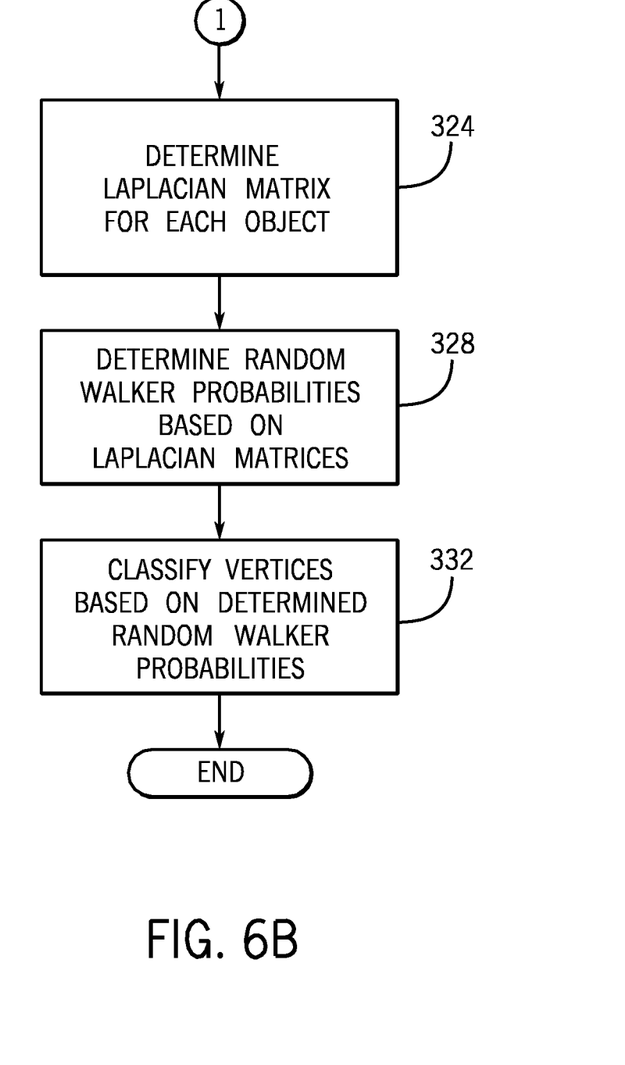

To summarize, FIGS. 6A and 6B depict a technique 300 to semi-automatically segment an image in accordance with an example implementation. Referring specifically to FIG. 6A, pursuant to the technique 300, an image is first oversegmented using a mean shift algorithm, pursuant to block 304. The result is a graph that is constructed, which has vertices and edges, as depicted in block 308. A color density for each object is then determined (block 312) based on user-identified seeds for each object, and based on the determined color densities conditional probabilities are determined (block 316) for each vertex given the color of the vertex. The technique 300 includes determining (block 320) edge weights based on the conditional probabilities. Referring specifically to FIG. 6B, the technique 300 further includes determining a Laplacian matrix for each object, pursuant to block 324. Based on these Laplacian matrices, random walker probabilities are then determined, pursuant to block 328, and the vertices are then classified (block 332) based on the determined random walker probabilities.

Figure 4:
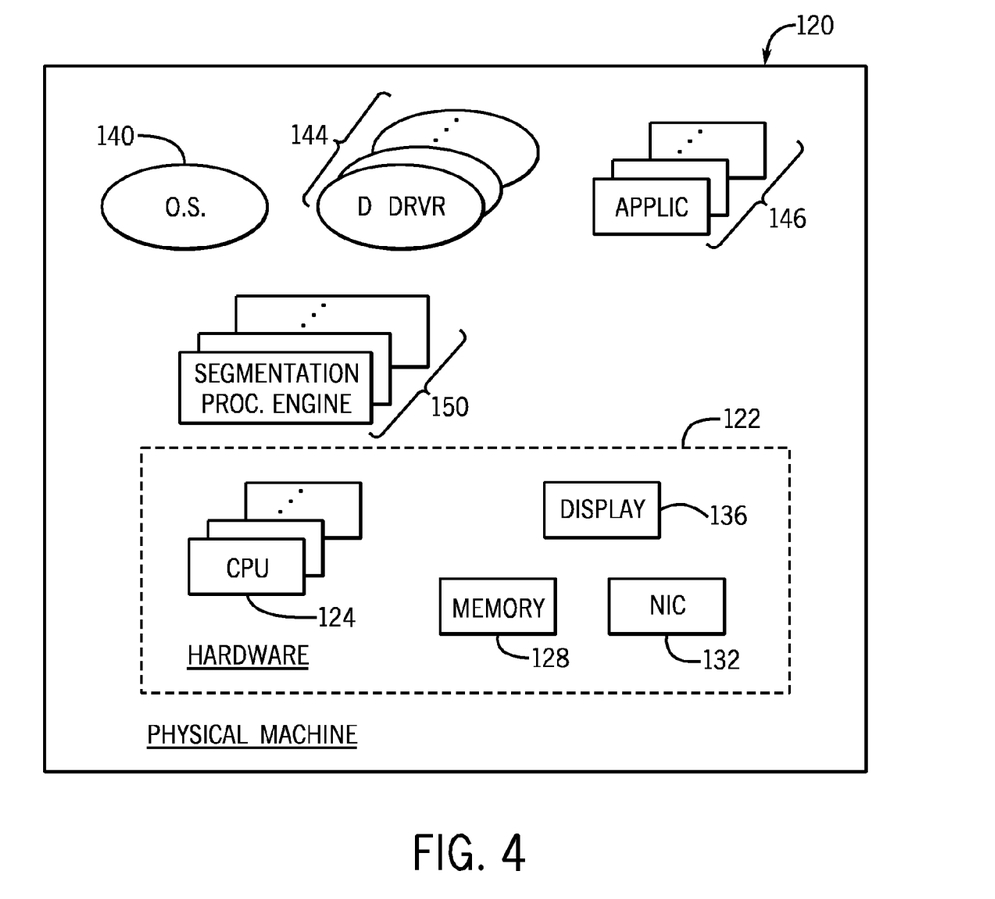
FIG. 4 is a schematic diagram of a physical machine according to an example implementation.

Referring to FIG. 4, in accordance with example implementations, the systems and techniques that are disclosed herein may be implemented in, for example, a system that includes at least one physical machine 120. In this context, a "physical machine" indicates that the machine is an actual machine made up of executable program instructions and hardware. Examples of physical machines include computers (e.g., application servers, storage servers, web servers, etc.), communications modules (e.g., switches, routers, etc.) and other types of machines. The physical machine(s) may be located within one cabinet (or rack), or alternatively, the physical machine(s) may be located in multiple cabinets (or racks).

In accordance with a specific example disclosed herein, the physical machine 120 contains machine executable program instructions and hardware 122 that executes the instructions for purposes of semi-automatically segmenting an image based at least in part on user-provided input and color probability densities that the machine 120 determines from this input. In this manner, the machine executable instructions cause the physical machine 120 to provide a user interface that allows a user to select regions of an image to be segmented, thereby marking objects to be segmented as well as identifying pixels of these objects. The instructions when executed by the physical machine 120 further cause the physical machine 120 to perform one or more parts of the techniques 100 (see FIG. 3) and 300 (see FIGS. 6A and 6B), in accordance with various implementations for purposes of performing the segmentation.

It is noted that FIG. 4 is merely an example of an architecture that might be used to perform the semi-automatic segmentation techniques that are disclosed herein. In this regard, the architecture to perform the techniques that are disclosed herein may include one or multiple additional physical machines 120, other than the physical machine 120 that is depicted in FIG. 4. Thus, all or part of any of the techniques that are disclosed herein, such as the techniques 100 and 300, may be implemented on a single physical machine or on more than two physical machines, depending on the particular implementation. Moreover, although the physical machine 120 is depicted in FIG. 4 as being contained within a box, it is noted that the physical machine 120 may be a distributed machine having multiple nodes, which provide a distributed and parallel processing system.

Regarding more specific details of an exemplary implementation, the machine executable instructions of the physical machine 120 may include one or multiple applications 146, an operating system 140 and one or multiple device drivers 144 (which may be part of the operating system 140). In general, the machine executable instructions may be stored in non-transitory storage, such as in a memory 128 of the physical machine 120. In general, the machine executable instructions may be stored in a non-transitory medium or non-transitory media, such as in system memory, in a semiconductor memory, in removable storage, in optical storage, in magnetic storage, in non-removable storage, in storage separate (local or remote) from the physical machine 120, etc., depending on the particular implementation. The memory 128 may also store data indicative of the image to be segmented, and the physical machine 120 may construct the graph G based on this data.

In addition to the memory 128, hardware 122 of the physical machine 120 includes one or multiple processors that execute the machine executable instructions, such as one or multiple central processing units (CPUs) and/or one or multiple processing cores of the CPU(s) 124. The hardware 122 may contain various other components, such as a network interface card (NIC) 132 and a display 136 to allow a user to select objects of an image for a segmentation, view the results of the segmentation, etc.

In general, the hardware 122 of the physical machine 120 executes machine executable instructions to cause the physical machine 120 to create one or multiple segmentation processing engines 150 that perform(s) all or parts of any of the techniques that are disclosed herein, such as the techniques 100 and 300. As a non-limiting example, one segmentation processing engine 150 may be associated with oversegmentation, another segmentation processing engine 150 may be used to determine probability densities or conditional probabilities; another segmentation processing engine 150 may be used to determine edge weights; another segmentation processing engine 150 may be used to determine the random walker probabilities and identify boundaries of the segmented objects; another segmentation processing engine 150 may construct the graph G; etc. Moreover, one or more of the above-described functions may be combined within a given segmentation processing engines 150. It is also noted that the segmentation engines 150 are merely an example of one implementation, in that the techniques that are disclosed herein may be implemented partially or solely in hardware (i.e., not by a processor executing software), in accordance with other implementations. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
representing an image to be segmented using a graph comprising vertices and edges, a subset of the vertices being marked as belonging to a plurality of objects;
using a processor-based machine to assign weights to the edges based at least in part on color probability densities associated with the objects derived from the subset of vertices marked as belonging to the plurality of objects; and
segmenting the image, comprising identifying boundaries of the objects based at least in part on the weights and the graph.

2. The method of claim 1, further comprising:
oversegmenting the image to generate the graph.

3. The method of claim 2, wherein the oversegmenting the graph comprises applying a mean shift algorithm to subdivide the image into segments and assigning the vertices of the graph to kernels associated with the segments.

4. The method of claim 1, wherein the identifying comprises applying random walker-based segmentation using the weights and the graph.

5. The method of claim 1, wherein the using the processor-based machine to assign the weights comprises:
for each edge defined by a pair of the vertices, determining an associated conditional probability that each vertex of the pair of vertices is part of one of the objects given a color of the vertex, and basing the weight of said each edge on the associated conditional probabilities.

6. The method of claim 5, wherein the using the processor-based machine to assign the weights further comprises:
varying the weight of said each edge inversely with respect to a difference of the associated conditional probabilities.

7. The method of claim 1, wherein the identifying comprises:
for each vertex not part of the subset of marked vertices, determining, for each object of the plurality of objects, a probability that said each vertex belongs to said each object of the plurality of objects based at least in part on the weights and the graph;
selectively assigning the vertices to the objects based at least in part on the determined probabilities to derive the identified boundaries.

8. A system comprising:
a memory to store data indicative of an image to be segmented; and
at least one machine-based processing engine adapted to:
process the data to construct a graph comprising vertices and edges, a subset of the vertices being marked as belonging to a plurality of objects; and
assign weights to the edges based at least in part on color probability densities associated with the objects derived from the subset of vertices marked as belonging to the plurality of objects; and
segment the image, comprising identifying boundaries of the objects based at least in part on the weights and the graph.

9. The system of claim 8, wherein said at least one processing engine is adapted to oversegment the image to generate the graph.

10. The system of claim 8, wherein said at least one processing engine is adapted to apply a mean shift algorithm to subdivide the image into segments and assign the vertices of the graph to kernels associated with the segments.

11. The system of claim 8, wherein said at least one processing engine is adapted to apply random walker-based segmentation using the weights and the graph to identify the boundaries.

12. The system of claim 8, wherein said at least one processing engine is adapted to execute machine executable instructions to form said at least one processing engine.

13. The system of claim 8, wherein said at least one processing engine is adapted to:
for each edge defined by a pair of the vertices, determine an associated conditional probability that each vertex of the pair of vertices is part of one of the objects given a color of the vertex, and base the weight of said each edge on the associated conditional probabilities.

14. The system of claim 8, wherein said at least one processing engine is adapted to:
for each vertex not part of the subset of marked vertices, determining, for each object of the plurality of objects, a probability that said each vertex belongs to said each object of the plurality of objects based at least in part on the weights and the graph;
selectively assign the vertices to the objects based at least in part on the determined probabilities to derive the identified boundaries.

15. An article comprising a storage readable by at least one processor storing instructions that when executed by said at least one processor causes said at least one processor to:
represent an image to be segmented using a graph comprising vertices and edges, a subset of the vertices being marked as belonging to a plurality of objects;
assign weights to the edges based at least in part on color probability densities associated with the objects derived from the subset of vertices marked as belonging to the plurality of objects; and
segment the image, comprising identifying boundaries of the objects based at least in part on the weights and the graph.

16. The article of claim 15, the storage medium storing instructions that when executed by said at least one processor causes said at least one processor to oversegment the image to generate the graph.

17. The article of claim 16, the storage medium storing instructions that when executed by said at least one processor cause said at least one processor to apply a mean shift algorithm to subdivide the image into segments and assign the vertices of the graph to kernels associated with the segments.

18. The article of claim 15, the storage medium storing instructions that when executed by said at least one processor cause said at least one processor to apply random walker-based segmentation based on the weights and the graph.

19. The article of claim 15, the storage medium storing instructions that when executed by said at least one processor cause said at least one processor to:
for each edge defined by a pair of the vertices, determine an associated conditional probability that each vertex of the pair of vertices is part of one of the objects given a color of the vertex, and base the weight of said each edge on the associated conditional probabilities.

20. The article of claim 15, the storage medium storing instructions that when executed by said at least one processor cause said at least one processor to:
for each vertex not part of the subset of marked vertices, determine, for each object of the plurality of objects, a probability that said each vertex belongs to said each object of the plurality of objects based at least in part on the weights and the graph;
selectively assign the vertices to the objects based at least in part on the determined probabilities to derive the identified boundaries.

* * * * *